United States Patent Office 3,694,362
Patented Sept. 26, 1972

3,694,362
AZEOTROPIC COMPOSITION
Joseph A. Floria, Pennnsville, N.J., assignor to E. I. du Pont de Nemours and Company, Wilmington, Del.
No Drawing. Filed July 2, 1970, Ser. No. 52,119
Int. Cl. C09k 3/02
U.S. Cl. 252—67     2 Claims

ABSTRACT OF THE DISCLOSURE

An azeotropic composition, useful in the distillative separation of mixtures of dichlorodifluoromethane and chlorine, for extracting heat from articles and for reducing microorganism populations of articles, especially foods, consisting of, on a weight basis, 27 to 37% dichlorodifluoromethane and 73 to 63% chlorine and having a boiling point of −37.6 to −37.5° C. at 754 mm. Hg pressure.

BACKGROUND OF THE INVENTION (1) Field of the invention

This invention relates to an azeotropic composition of dichlorodifluoromethane and chlorine.

(2) Description of the prior art

Mixtures comprising dichlorodifluoromethane and chlorine resulting from the preparation of dichlorodifluoromethane were known at least as early as 1930. For example, Midgley et al. reported in Industrial and Engineering Chemistry, 22, 542–545 (1930) the preparation of dichlorodifluoromethane employing the Swarts reaction; the reaction products comprising dichlorodifluoromethane and chlorine were condensed at the head of a fractionating column. There was no recognition that dichlorodifluoromethane and chlorine could form an azetropic composition.

Others reporting mixtures of dichlorodifluoromethane and chlorine include Calfee et al. in U.S. Pats. 2,417,059 and 2,459,767, in the process of preparing dichlorodifluoromethane by chlorinolysis of 1,1 - difluoroethane, and Muetterties in U.S. Pat. 2,709,184, in the process of preparing dichlorodifluoromethane from carbon, chlorine and an inorganic fluoride at high temperatures.

In the aforesaid prior art separation of chlorine from dichlorodifluoromethane is effected by means of an aqueous caustic wash.

DESCRIPTION OF THE INVENTION

The invention resides in an azeotropic composition of dichlorodifluoromethane and chlorine and in a process for distillatively separating mixtures of dichlorodifluoromethane and chlorine.

The azeotropic composition of this invention consists of, on a weight basis, 27 to 37% dichlorodifluoromethane and 73 to 63% chlorine and has a boiling point of −37.6 to −37.5° C. at 754 mm. Hg pressure. Since the azeotropic composition contains a minor weight fraction of dichlorodifluoromethane, it provides a convenient means of separating pure dichlorodifluoromethane from dichlorodifluoromethane-rich mixtures of the fluoroorganic compound and chlorine.

The azeotropic composition of this invention also is useful in direct contact ebullient food freezing processes which employ dichlorodifluoromethane as the freezant. Such processes are described by Alaburda et al. U.S. Pat. 3,368,363 and by Waldin in U.S. Pat. 3,498,069. Such an azeotropic composition has been found to be particularly useful in a continuous process wherein microorganism populations of articles, particularly foods, are reduced by contacting them with dichlorodifluoromethane having a microorganism level less than that of the dichlorodifluoromethane after it has contacted the articles. In such a process chlorine effectively reduces the microorganism populations of the fluoroorganic compound to a sufficiently low level that it can be recycled to the article contacting step to reduce the microorganism populations of the articles. Furthermore, in a process as just described, if desired the fluoroorganic compound of reduced microorganism population can be distillatively separated into the azeotropic composition of this invention and pure dichlorodifluoromethane, with the latter, having a low microorganism level, being recycled to the article contacting step. Under such a mode of operation the articles are first contacted with dichlorodifluoromethane. Then fluoroorganic compound which has contacted the articles is removed from the contacting zone or chamber and an effective amount of chlorine is added thereto and maintained therein for a sufficient time to reduce the microorganism populations to the desired level. The fluoroorganic compound/chlorine mixture is then fractionally distilled and the purified organic fraction, that is, dichlorodifluoromethane having the desired low level of microorganisms, is collected and recycled to the article contacting step to reduce the microorganism populations of the articles being treated.

A generic process wherein the microorganism populations of articles such as foods are reduced is described by Kavsy D. Dastur in the copending application Ser. No. 51,609 filed July 1, 1970.

EXAMPLE

A 250 ml. round bottom flask was connected via a vertical, empty, approximately 10-inch long, Liebig condenser to a Dewar condenser, the upper outlet of which was protected by a "Drierite"-filled drying tube. A calibrated thermometer was suspended so as to hang freely inside the Liebig condenser, with the thermometer bulb extending into the vapor space of the flask. The flask was fitted with a closable side arm for charging gases to the system. Equipment parts were joined with unlubricated standard taper joints fitted with "Teflon" polytetrafluoroethylene sleeves. During reflux, heating was supplied to the flask by a conventional electric heater provided with a "Transite" heat shield fitted about the flask so as to protect the flask's vapor space from radiated heat.

A "Hengar" boiling stone was added to the flask and the equipment was flushed via the flask side arm with dry nitrogen. Carbon ice and trichlorofluoromethane was charged to the Dewar condenser and to a pan temporarily enclosing the flask. Gaseous chlorine (51.2 g.) was charged from a tared cylinder to the flask via the side arm. The pan eenclosing the flask was replaced by the electric heater and "Transite" heat shield. Heating was adjusted until the chlorine refluxed in a slow steady stream. When the temperature was constant for ten minutes, the temperature and the atmospheric pressure were recorded.

The electric heater was replaced by the aforesaid pan and freezing mixture and gaseous dichloro difluoromethane was charged in successive amounts from 2 to 10 g. each to produce dichlorodifluoromethane/chlorine mixtures. The boiling points of the mixtures and the corresponding atmospheric pressures were measured after each addition.

After evaluating the mixtures the initial portion of the experiment was repeated except that dichlorodifluoromethane was substituted for chlorine. Thus, the boiling point of dichlorodifluoromethane was obtained.

The boiling point data are given in Table 1.

TABLE 1

| Wt. percent chlorine in mixture | B.P. (° C.) | Pressure (mm. Hg) |
|---|---|---|
| 100 | −35.7 | 753.9 |
| 93 | −36.5 | 754.1 |
| 86 | −37.0 | 754.1 |
| 74 | −37.2 | 753.7 |
| 72 | −37.4 | 753.8 |
| 67 | −37.6 | 753.8 |
| 63 | −37.5 | 753.5 |
| 62 | −37.4 | 753.5 |
| 55 | −34.9 | 753.5 |
| 50 | −32.9 | 753.5 |
| 0 | −29.9 | 754.0 |
| 0 | −30.1 | 755.8 |

By plotting the data of Table 1 it was determined that an essentially constant boiling point of −37.6 to −37.5° C. at a pressure of 754 mm. of Hg was obtained over the range 73 to 63 weight percent chlorine and 27 to 37 weight percent dichlorodifluoromethane. The minimum boiling point occurred at 33% dichlorodifluoromethane and 67% chlorine.

The embodiments of the present invention in which an exclusive property or privilege is claimed are defined as follows:

1. The azeotropic composition consisting of, on a weight basis, 27 to 37% dichlorodifluoromethane and 73 to 63% chlorine and having a boiling point of −37.6 to −37.5° C. at 754 mm. Hg pressure.

2. The composition of claim 1 having 33% dichlorodifluoromethane and 67% chlorine.

References Cited

UNITED STATES PATENTS

| 2,417,059 | 3/1947 | Calfee et al. |
| 2,459,767 | 1/1949 | Calfee et al. |
| 2,709,184 | 5/1955 | Muetterties. |

LEON D. ROSDOL, Primary Examiner

H. A. PITLICK, Assistant Examiner

U.S. Cl. X.R.

99—198, 199; 203—50, 57; 252—DIG. 9